United States Patent
Kahlman et al.

(10) Patent No.: US 7,319,843 B2
(45) Date of Patent: Jan. 15, 2008

(54) STORAGE UNIT COMPRISING A MAIN DATA CARRIER AND A CONTACTLESS CHIP

(75) Inventors: Josephus Arnoldus Henricus Maria Kahlman, Tilburg (NL); Steven Broeils Luitjens, Eindhoven (NL)

(73) Assignee: Koninkljke Philips Electronics N.V., Eindhoven (NL)

( * ) Notice: Subject to any disclaimer, the term of this patent is extended or adjusted under 35 U.S.C. 154(b) by 86 days.

(21) Appl. No.: 10/538,579

(22) PCT Filed: Dec. 5, 2003

(86) PCT No.: PCT/IB03/05736

§ 371 (c)(1),
(2), (4) Date: Jun. 15, 2005

(87) PCT Pub. No.: WO2004/055719

PCT Pub. Date: Jul. 1, 2004

(65) Prior Publication Data
US 2006/0135207 A1    Jun. 22, 2006

(30) Foreign Application Priority Data
Dec. 18, 2002    (EP) .................................. 02293135

(51) Int. Cl.
*H04B 5/00*    (2006.01)
(52) U.S. Cl. ..................... 455/41.1; 455/41.2; 455/421; 340/905; 340/928; 340/933
(58) Field of Classification Search ............... 455/41.1, 455/41.2, 421; 340/928, 933, 905
See application file for complete search history.

(56) References Cited

U.S. PATENT DOCUMENTS

| | | | |
|---|---|---|---|
| 5,862,117 A | 1/1999 | Fuentes et al. | |
| 6,079,619 A * | 6/2000 | Teraura et al. | 235/380 |
| 6,842,606 B1 * | 1/2005 | Takemura | 455/41.1 |
| 2001/0011012 A1 * | 8/2001 | Hino et al. | 455/90 |
| 2002/0060969 A1 * | 5/2002 | Shimazaki et al. | 369/77.2 |
| 2002/0115410 A1 * | 8/2002 | Higashino et al. | 455/41 |
| 2002/0177407 A1 * | 11/2002 | Mitsumoto | 455/41 |
| 2004/0077313 A1 * | 4/2004 | Oba et al. | 455/41.2 |
| 2004/0092231 A1 * | 5/2004 | Ayatsuka et al. | 455/41.2 |

FOREIGN PATENT DOCUMENTS

| | | |
|---|---|---|
| EP | 1001348 A2 | 5/2000 |
| EP | 1001348 A3 | 5/2000 |
| EP | 1001348 B1 | 2/2005 |
| WO | WO9952066 A | 10/1999 |
| WO | 0106507 A1 | 1/2001 |
| WO | WO0217316 A1 | 2/2002 |

OTHER PUBLICATIONS

ISR for Publication, International Publication No. WO2004/055719.

* cited by examiner

*Primary Examiner*—Matthew Anderson
*Assistant Examiner*—Tuan Pham
(74) *Attorney, Agent, or Firm*—Michael E. Belk

(57) ABSTRACT

A storage unit for a portable radio-communication device includes a main data carrier and a contactless chip associated with the main data carrier. Device data descriptive of the storage unit is transmitted to the portable radio-communication. Further, a warning is transmitted to the portable radio-communication device in response to a storage unit wanted notice. A powering signal is transmitted to the contactless chip. The powering signal provides power to the contactless chip and is modulated with data. Specific data sent by the portable radio-communication device is stored on the contactless chip and, on request, data is returned.

8 Claims, 3 Drawing Sheets

STORAGE UNIT COMPRISING A MAIN DATA CARRIER AND A CONTACTLESS CHIP

FIELD OF THE INVENTION

The invention deals with a portable radio-communication device designed for communicating with a contactless chip associated with a main data carrier. It also deals with a storage unit comprising a main data carrier and a contactless chip associated with said main data carrier. It also deals with a method of manufacturing such a storage unit. It also deals with a system comprising such a portable radio-communication device and such a storage unit.

The invention advantageously applies to storage on optical discs, more specifically storage on miniature optical discs to be played in portable electronic devices such as mobile phones, personal digital assistants, game stations, etc. . . .

BACKGROUND OF THE INVENTION

The international patent application WO 02/17316 filed by Koninklijke Philips Electronics N.V. on Feb. 28, 2002 describes a storage unit intended to be read by a player. This storage unit is composed of a data carrier in which a contactless integrated circuit (also referred to as chip) is embedded. The chip comprises receiving means for receiving a powering signal and transmitting means for transmitting a scrambling/descrambling key to be used for writing/reading data on said data carrier. The contactless chip is powered optically by the player when the data carrier is in the player. In WO 02/17316, the chip is used to protect the data carrier against copying.

One of the objects of the present invention is to propose other applications for storage units that comprise a main data carrier and a chip associated with said main data carrier, the proposed applications being directed to a use of such storage units with portable radio-communication devices.

Another object of the present invention is to propose a portable radio-communication device specifically designed for implementing such applications.

Another object of the present invention is to propose another form of storage medium specifically suited for use in portable radio-communication devices.

Still another object of the invention is to propose a method of manufacturing such storage units.

SUMMARY OF THE INVENTION

According to the invention, the chip associated with the main data carrier is intended to be powered by a portable radio-communication device and is used for implementing at least one of the following applications:
a) transmitting to the portable radio-communication device data descriptive of the storage unit;
b) transmitting a warning to the portable radio-communication device in response to a wanted notice;
c) storing specific data sent by the portable radio-communication device,
d) on request, returning said specific data.

The portable radio-communication device comprises a reading and/or writing unit for reading and/or writing data on said main data carrier. In addition to that, it is specifically designed to power the contactless chip, to send device data to the chip, to receive chip data from the chip, and to execute one of the following actions:

a) displaying chip data sent by the chip;
b) writing chip data sent by the chip on the main data carrier associated with the chip;
c) authorizing/denying access to the main data carrier in dependence on chip data sent by the chip.

In a first exemplary embodiment of the invention, if the storage unit is too small to carry information in a form that is directly readable by the user, advantageously:
the display of the portable radio-communication device is used to display data descriptive of the storage unit (for example the title, the table of contents, . . . );
and/or the portable radio-communication device is designed so as to send a wanted notice relating to a storage unit, and the storage unit is designed so as to send a warning when receiving a wanted notice directed to it (for example the warning may be a light and/or an acoustic signal).

In a second exemplary embodiment of the invention, the device data sent by the portable radio-communication device to be stored in the chip is a user-defined data, for example a password and/or a parental control data, intended to be retrieved by the portable device in order to authorize/deny reading/writing on the main data carrier.

In a third exemplary embodiment of the invention, the chip is used as a buffer locked to the main data carrier, in which data intended to be stored in said main data carrier are stored (for example because writing into the main data carrier is temporarily impossible due to bad mechanical conditions, insufficient power, or insufficient available memory space in the main data carrier).

If the main data carrier is too small to carry the chip, the storage unit advantageously comprises a caddy in which the main data carrier is packed and the chip is embedded. The term "caddy" denotes items like cartridges or cassettes.

The portable radio-communication device comprises radio-communication means generating radio-communication signals for communication over a radio-communication network (for example a GSM or a GPRS network).

Advantageously, these radio-communication signals are used to generate the powering signal intended for powering the contactless chip. This is achieved by providing the portable radio-communication device with:
adaptation means for adapting the frequency of said radio-communication signal to an operating frequency of said contactless chip, so as to generate said powering signal,
demodulation means for demodulating said returned signal so as to retrieve said chip data,
and optionally, modulation means for modulating said powering signal with data, called device data, so as to transmit said device data to said contactless chip.

Avoiding the use of a complete contactless reader for powering/communicating with the contactless chip reduces the cost of such portable radio-communication devices.

BRIEF DESCRIPTION OF THE DRAWINGS

These and other aspects of the invention are further described with reference to the following drawings.

DESCRIPTION OF PREFERRED EMBODIMENTS

Figure 1:
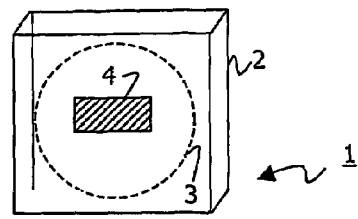
FIG. 1 is a schematic representation of an example of a storage unit according to the invention.

FIG. 1 is a representation of a non-limitative example of a storage unit according to the invention. The storage unit 1 comprises a caddy 2, a main data carrier 3 packed in the caddy 2, and a contactless chip 4 embedded in the caddy 2. In this example the main data carrier is a miniature optical disc using blue laser technology (with this technology it is currently possible to store up to 1 Gbyte on a disc having a 3 cm diameter).

The contactless chip 4 is a passive device operated by radio-frequency coupling to a reader station. This means that the contactless chip is only activated when it is in the response range of a reader station. Preferably, the contactless chip 4 is a microprocessor-based device.

Figure 2:
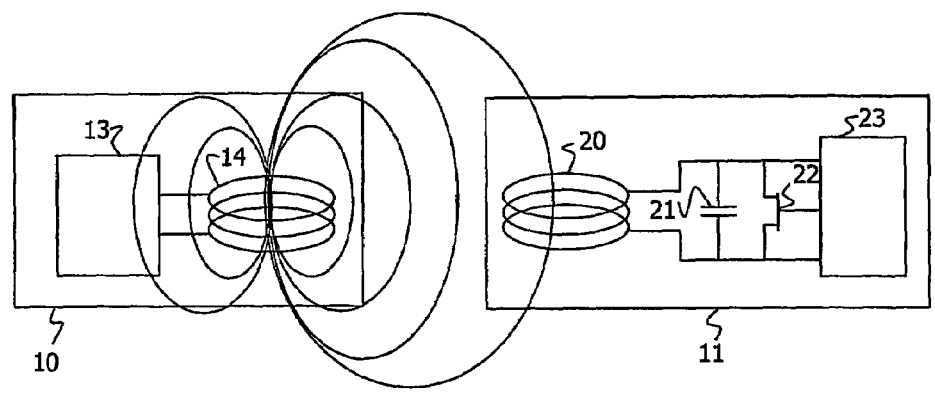
FIG. 2 is an explanatory diagram of a known powering/communicating mechanism used with contactless radio frequency devices.

FIG. 2 is an explanatory diagram of a known powering/communicating mechanism used between a reader station 10 and a contactless passive radio-frequency device 11. The reader station 10 comprises a high frequency module 13 for transmitting/receiving high-frequency signals and a coupling element represented by a first coil 14. The contactless passive radio frequency device 11 comprises a coupling element represented by a second coil 20, a capacitor 21 connected in parallel with the second coil 20, a load 22 (for example a resistor) also connected in parallel with the second coil 20, and an integrated circuit 23. The capacitance of the capacitor 21 is selected such that it combines with the inductance of the second coil 20 to form a parallel resonant circuit with a resonance frequency that corresponds to the transmission frequency of the reader station 10. The load 22 is controlled by the integrated circuit 23.

The first and the second coil can be seen as the components of a radio-frequency transformer. The primary coil of the transformer is the coil 14 of the reader station 10. The secondary coil of the transformer is the coil 20 of the contactless device 11. The space between the coils is the transformer's air core. When the contactless device 11 is placed within the magnetic field generated by the reader station 10, a flow of current is induced in the coil 20, thereby generating a signal used to power the integrated circuit 23.

Modulating the current as it passes through the first coil 14 allows data to be transmitted to the second coil 20. When powered, the integrated circuit 23 achieves demodulation so as to recover the transmitted data.

The energy that is drawn from the magnetic field by the contactless device 11 can be measured at the reader station 10. Therefore, changing of the load 22 has the effect of a modulation. Data transfer from the contactless device 11 to the reader station 10 is achieved by controlling the value of the load 22 in dependence on the data to be sent to the reader station 10 (this type of data transfer is known as load modulation).

According to the invention, the reader station is part of a portable radio-communication device, for example a mobile phone. Portable radio-communication devices comprise radio-communication means generating radio-communication signals for communication over a radio-communication network (for example a GSM or a GPRS network). Advantageously, instead of providing the portable radio-communication device with a complete reader station, the radio-communication means that are available in the portable radio-communication device are used for powering and communicating with the contactless chip.

Figure 3:
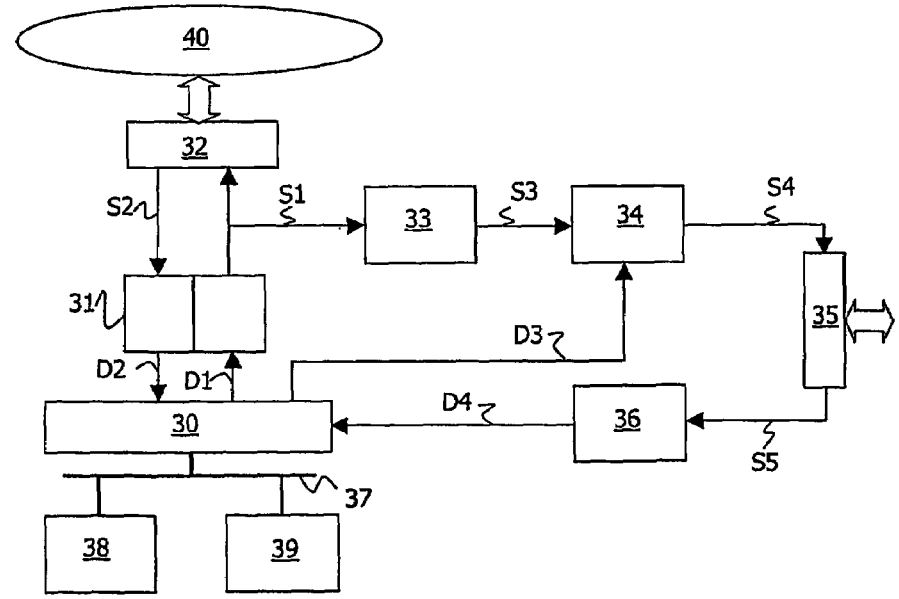
FIG. 3 is a schematic diagram of an example of portable radio-communication device according to the invention.

An example of a portable radio-communication device according to the invention is shown in FIG. 3. It comprises a central microprocessor unit 30, a radio-communication unit 31, a radio-communication antenna 32, a frequency multiplier 33, a modulation unit 34, a coupling device 35, a demodulation unit 36, a bus 37, a man-machine interface 38 and a reading/writing unit 39 for reading and/or writing data on a main data carrier. For example, the man-machine interface 38 comprises a display, a speaker, a microphone, a keyboard, etc . . . . Elements that are not essential for the understanding of the present invention are omitted in this description.

The central microprocessor unit 30, the man-machine interface 38, and the reading/writing unit 39 are connected to the bus 37. The central microprocessor unit 30 sends radio-communication data D1 intended for transmission over a radio-communication network 40 to the radio-communication unit 31. The radio-communication unit 31 generates a radio-communication signal S1 carrying the radio-communication data D1. The radio-communication signal S1 is transmitted over the air via the antenna 32. Antenna 32 is also capable of receiving a radio-communication signal S2 via the radio-communication antenna 32. The received signal S2 is processed by the radio-communication unit 31 so as to recovere radio-communication data D2 carried by the radio-communication signal S2. The recovered radio-communication data D2 are transmitted from the radio-communication unit to the central microprocessor unit 31. The central microprocessor unit 31 processes the recovered radio-communication data D2 for presentation to the user via the man-machine interface 38.

For example, in the GSM radio-communication network, the radio-communication signal S1 generated by the radio-communication unit 31 is in the frequency range [890 MHz-915 MHz]. Known powering/communicating mechanisms of the type described with reference to FIG. 2 operate in the ISM bands (Industrial Scientific Medical). Advantageously, the system of the invention operates in the 2,45 MHz ISM band.

The frequency multiplier 33 is used to obtain a carrier S3 in the 2,45 MHz ISM band from the radio-communication signal S1 delivered by the radio-communication unit 31. Then the modulation unit 34 modulates the carrier S3 with data D3 (called device data) delivered by the central microprocessor unit 30. For example the modulation unit 34 is an amplitude modulation unit. The modulated signal S4, which carries the device data D3, is applied to the coupling device 35.

The coupling device 35 is also capable of receiving a modulated signal S5 generated by the contactless chip 4. The received signal S5 carries chip data D4. It is forwarded to the demodulation unit 36 that is responsible for recovering the chip data D4. The recovered chip data D4 are forwarded to the central microprocessor unit 31.

It is to be noted that the modulation unit 34 is optional. The modulation unit 34 can be omitted in applications in which no device data have to be transmitted to the contactless chip.

As far as the communication with the contactless chip 4 is involved, the microprocessor unit 30 is responsible for controlling the execution of at least one of the following actions:

displaying chip data D4 sent by the chip;
writing chip data D4 sent by the chip on the main data carrier associated with the chip;
authorizing/denying access to the main data carrier in dependence on chip data D4 sent by the chip;

transmitting device data D3 relating to a request for storing specific data in said chip, transmitting device data D3 relating to a request for retrieving specific data stored in said chip.

Examples of operation of a system according to the invention will now be described with reference to FIGS. 4 to 7.

Figure 4:
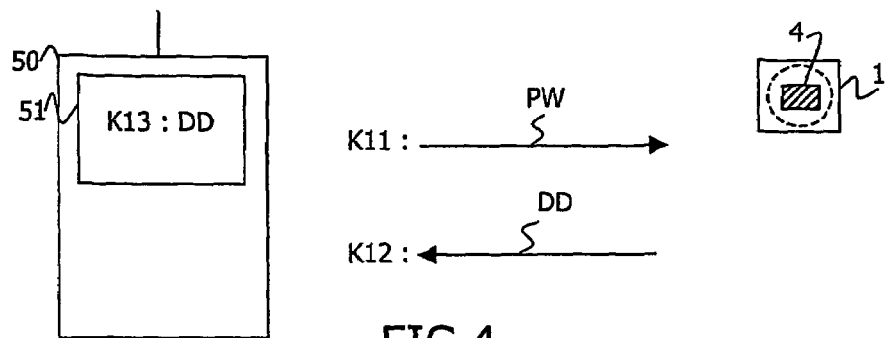
FIGS. 4 to 7 are operational diagrams of embodiments of a system according to the invention.

In a first embodiment represented in FIG. 4, the portable radio-communication device 50 has a display 51 used to display data descriptive of the storage unit 1. Data descriptive of the storage unit 1 may be a title, a table of contents, etc . . . . If the storage unit 1 is in the range of the portable radio-communication device 50 (step K11), it receives a powering signal PW. In this first embodiment, the chip 4 is programmed so as to return data DD that are descriptive of the storage unit 1 upon reception of the powering signal (step K12). And the portable radio-communication device 50 is programmed so as to display the received chip data. In this first embodiment, the storage unit may be either inside or outside the portable radio-communication device. If the storage unit is inside the portable radio-communication device, an advantage of recovering the data descriptive of the storage unit from the chip 4 rather than from the main data carrier 3 is that it requires less energy; and energy savings are important for portable devices.

The data DD are stored, for example, in the chip 4 during the manufacturing process. The DD data may also be stored in the chip later on, for example by a specific programming device available at a programming shop.

Figure 5:
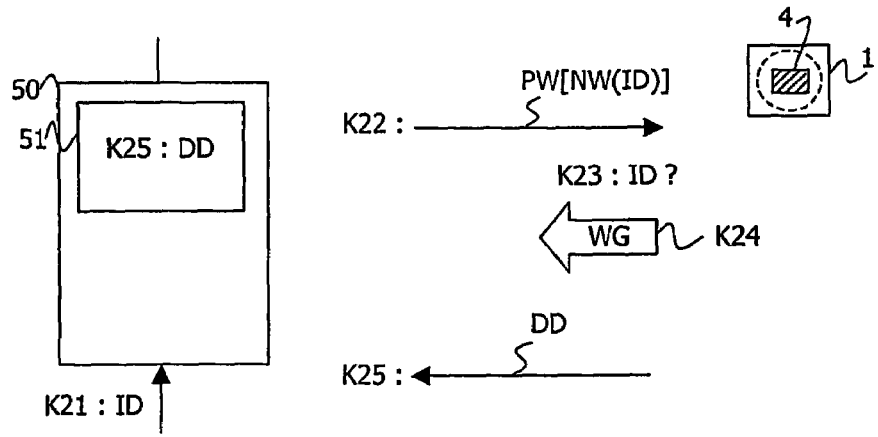

In a second embodiment represented in FIG. 5, the user of the portable radio-communication device, who is in the vicinity of a collection of storage units, can input or select an identifier ID of a storage unit that he wants to find via the man-machine interface (step K21). The portable radio-communication device is programmed so as to send a wanted notice NW(ID) for that specific storage unit (step K22). The chips are programmed so as to send a warning WG when receiving a wanted notice directed to them (steps K23 and K24). The warning may be, for example, a light and/or an acoustic signal. In addition to such a warning, the chip may also send data DD descriptive of the wanted storage unit (step K25) for display by the portable radio-communication device (step K26).

Figure 6:
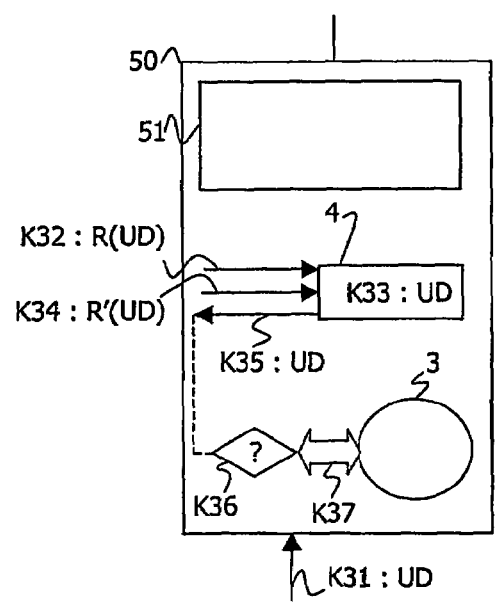

In a third embodiment represented in FIG. 6, the portable radio-communication device is programmed so as to allow the user to input user-defined data UD via the man-machine interface of the device (step K31) when the storage unit is in the device. After input by the user, a request R(UD) for storing the user-defined data is sent to the chip (step K32). Upon reception of such a request, the user-defined data are stored in the chip 4 (step K33). The portable radio-communication device is also programmed for sending a request R'(UD) for retrieving user-defined data UD previously stored in the chip 4 (step K34). Upon reception of such a request, the chip 4 returns the user-defined data UD (step K35). The user-defined data are, for example, a password and/or a parental control data, intended to be retrieved by the portable device in order to authorize/deny reading/writing on the main data carrier (steps K36 and K37).

Figure 7:
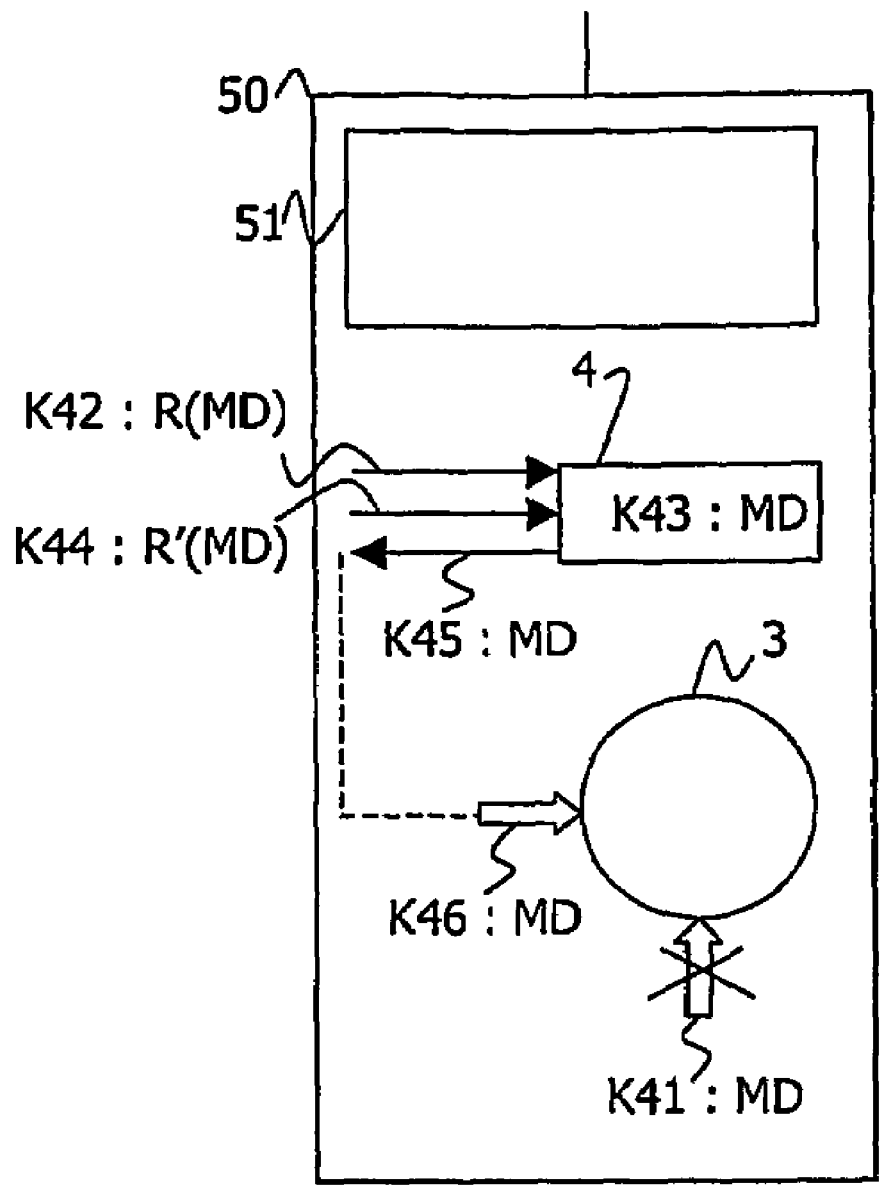

In a fourth embodiment represented in FIG. 7, the portable radio-communication device is programmed so that upon failure of an attempt to write main data MD on the main data carrier (step K41), a request R(MD) for storing the main data is sent to the chip 4 (step K42). Upon reception of such a request, the main data are stored in the chip 4 (step K43). The portable radio-communication device is also programmed for sending a request R'(MD) for retrieving main data previously stored in the chip 4 (step K44). Upon reception of such a request, the chip 4 returns the main data (step K45), and the main data are written on the main data carrier (step K46). This embodiment is advantageously used when the failure of the attempt to write in the main data carrier was due to temporaly causes (for example to bad technical conditions, insufficient power, or insufficient available memory space in the main data carrier).

Advantageously, the storage unit 1 is manufactured by a manufacturing method that comprises the following steps:

providing main data on a main data carrier, providing at least program instructions on a contactless chip that comprises receiving means for receiving a powering signal carrying data, processing means, memory means, and transmitting means for transmitting a signal carrying data, embedding said contactless chip in a caddy, packaging said main data carrier in said caddy, said program instructions being intended for the execution of at least one of the following actions when executed by said processing means:

a) upon reception of a powering signal that carries a request for storing specific data in said chip, storing said specific data in said memory means, b) upon reception of a powering signal that carries a request for retrieving specific data stored in said memory means, returning a signal carrying said specific data.

Advantageously, at least part of the main data are provided on the contactless chip (for example descriptive data).

The main data may be of any nature, for example it can comprise audio, video, games, maps . . . .

With respect to the described portable radio-communication device, storage unit and manufacturing method, modifications or improvements may be proposed without departing from the scope of the invention. The invention is thus not limited to the examples provided.

In particular alternative powering/communicating mechanisms may be used (for example the transmission from the portable device to the contactless chip may be done optically if the storage unit is inside the phone).

The reading and/or writing unit described above may be omitted from the portable radio-communication device, for example when the only contemplated applications relate to the display of chip data on the display of the portable radio-communication device.

The word "comprising" does not exclude the presence of other elements or steps than those listed in the claims.

The invention claimed is:

1. A portable radio-communication device comprising at least:

a display for displaying data, a radio transmission/reception unit for communicating over a radio-communication network using a radio-communication signal having a first frequency, and for transmitting a powering signal to a contactless chip associated with a main data carrier and for receiving a signal returned by said contactless chip, said powering signal providing power to said contactless chip and said returned signal carrying chip data relating to said main data carrier, a reading and/or writing unit for reading and/or writing data on said main data carrier, adaptation means for adapting the first frequency to an operating frequency of said contactless chip, so as to generate said powering signal, the first frequency being higher than the operating frequency of said contactless chip, modulation means for modulating said powering signal with device data so as to transmit said device data to said contactless chip, said powering signal providing power and said device data to said contactless chip, processing means for processing said chip data so as to execute at least one of the following actions:
a) displaying said chip data,
b) writing said chip data on said main data carrier, and
c) checking said chip data to authorize or deny reading or writing on said main data carrier.

2. The portable radio-communication device as claimed in claim 1, further comprising demodulation means for demodulating said returned signal so as to retrieve said chip data.

3. The portable radio-communication device as claimed in claim 1, designed so as to:
transmit first device data relating to a request for storing specific data in said contactless chip, and
transmit second device data relating to a request for retrieving specific data stored in said contactless chip.

4. A system comprising a portable radio-communication device as claimed in claim 1.

5. A storage unit comprising a main data carrier comprising an optical disk for storing content and a contactless chip associated with said main data carrier, said contactless chip comprising:
receiving means for receiving a powering signal sent by a portable radio-communication device, said powering signal providing power to said contactless chip and being modulated with a device data,
processing means,
memory means, and
transmitting means for executing the following actions:
a) returning chip data stored in said memory means and descriptive of said storage unit upon reception of a powering signal;
b) if said powering signal carries said device data that includes a wanted notice relating to a wanted storage unit, checking whether the storage unit is the wanted storage unit and transmitting a warning to said portable radio-communication device if said storage unit is the wanted storage unit;
c) if said powering signal carries device data relating to a request for storing a password provided by a user in said chip, storing said password in said memory means; and
d) if said powering signal carries device data relating to a request for retrieving said password stored in said memory means, transmitting said password;
wherein said portable radio-communication device comprises a reading/writing unit for reading/writing data in said optical disk when said optical disk is inserted in said portable radio-communication device, and wherein inputting said password by said user via said portable radio-communication device authorizes said portable radio-communication device to read/write the content on said optical disk.

6. The storage unit as claimed in claim 5, further comprising a caddy in which said optical is packed and said contactless chip is embedded.

7. A method of manufacturing a storage unit, said method comprising the acts of:
providing content on an optical disk,
providing at least program instructions on a contactless chip that comprises receiving means for receiving a powering signal carrying first data, processing means, memory means, and transmitting means for transmitting a signal carrying second data, said powering signal providing power to said contactless chip and being modulated with said first data,
embedding said contactless chip in a caddy, and
packaging said optical disk in said caddy, said program instructions being intended for the execution of the following actions when executed by said processing means:
a) upon reception of a powering signal that carries a request for storing specific data in said chip, storing said specific data in said memory means,
b) upon reception of a powering signal that carries a request for retrieving specific data stored in said memory means, returning a signal carrying said specific data, and
authorizing access to said content stored on said optical disk in response to receipt of a password.

8. A method of manufacturing a storage unit, said method comprising the acts of:
providing main data on an optical disk,
providing at least part of said main data, that is descriptive of said storage unit, and program instructions on a contactless chip that comprises receiving means for receiving a powering signal, processing means, memory means, and transmitting means for transmitting a signal carrying data, said powering signal providing power to said contactless chip and being modulated with desired data including a wanted notice, and
embedding said contactless chip in a caddy packaging said optical disk in said caddy, said program instructions being intended for the execution of the following actions when executed by said processing means:
a) upon reception of the powering signal, returning data stored in said memory means and descriptive of said storage unit,
b) upon reception of the powering signal that carries said wanted notice relating to a wanted storage unit, checking whether the storage unit is the wanted storage unit and, in such a case, transmitting a warning, and
authorizing access to said main data stored on said optical disk in response to receipt of a password.

* * * * *